United States Patent
Zotikov et al.

(10) Patent No.: US 12,470,585 B2
(45) Date of Patent: Nov. 11, 2025

(54) SYSTEM AND METHOD FOR SIMULATION OF CYBERATTACKS WITH EXECUTION CONFIRMATION

(71) Applicant: RAKUTEN SYMPHONY, INC., Tokyo (JP)

(72) Inventors: Dmitrii Zotikov, Tokyo (JP); Sota Aoki, Tokyo (JP)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 18/013,772

(22) PCT Filed: Oct. 31, 2022

(86) PCT No.: PCT/US2022/048405
§ 371 (c)(1),
(2) Date: Dec. 29, 2022

(87) PCT Pub. No.: WO2024/096855
PCT Pub. Date: May 10, 2024

(65) Prior Publication Data
US 2025/0080563 A1    Mar. 6, 2025

(51) Int. Cl.
*H04L 9/40*    (2022.01)
(52) U.S. Cl.
CPC .................. *H04L 63/1433* (2013.01)
(58) Field of Classification Search
CPC .................................................... H04L 63/1433
See application file for complete search history.

(56) References Cited

U.S. PATENT DOCUMENTS

| | | | | |
|---|---|---|---|---|
| 9,009,834 | B1 * | 4/2015 | Ren | G06F 21/6209 |
| | | | | 709/224 |
| 9,853,997 | B2 * | 12/2017 | Canzanese, Jr. | G06F 21/55 |
| 10,805,316 | B2 * | 10/2020 | Aditham | G06F 21/566 |
| 10,868,825 | B1 * | 12/2020 | Dominessy | H04L 43/045 |
| 2011/0209216 | A1 * | 8/2011 | Zohar | G06F 16/9535 |
| | | | | 726/22 |
| 2015/0067858 | A1 * | 3/2015 | Loriot | H04L 63/1433 |
| | | | | 726/23 |

(Continued)

FOREIGN PATENT DOCUMENTS

| | | | | |
|---|---|---|---|---|
| CN | 107426054 A | * | 12/2017 | ............. H04L 43/10 |
| CN | 114024740 A | * | 2/2022 | |

(Continued)

OTHER PUBLICATIONS

International Search Report dated Feb. 28, 2023 in Application No. PCT/US22/48405.

(Continued)

*Primary Examiner* — Sarah Su
(74) *Attorney, Agent, or Firm* — Sughrue Mion, PLLC (57) ABSTRACT

For more efficient confirmation of a successful cyberattack simulation, as a plurality of security tests are executed as a series on a testing processor, a search processor searches an activity log of a device targeted by the security tests for indicators of each test. The searches may execute in parallel with the tests on their respective processors. A test result for a test thereby reflects both the search result and the response of a security device to the execution of the test.

14 Claims, 7 Drawing Sheets

(56) References Cited

U.S. PATENT DOCUMENTS

2019/0109872 A1\* 4/2019 Dhakshinamoorthy ..................... G06F 21/577
2022/0201042 A1\* 6/2022 Crabtree ............. G06F 16/2477

FOREIGN PATENT DOCUMENTS

| CN | 115314281 A | \* | 11/2022 | |
|----|---|---|---|---|
| CN | 117879970 A | \* | 4/2024 | ............... H04L 9/40 |
| CN | 118890197 A | \* | 11/2024 | ......... H04L 63/0428 |
| EP | 3531650 A1 | \* | 8/2019 | ........... G06F 21/577 |
| EP | 4099656 A1 | \* | 12/2022 | ................ C23C 2/06 |
| KR | 20220098679 A | \* | 7/2022 | ............... H04L 9/40 |
| WO | WO-2013130066 A1 | \* | 9/2013 | ........... G06F 21/128 |

OTHER PUBLICATIONS

Written Opinion of the International Searching Authority dated Feb. 28, 2023 in Application No. PCT/US22/48405.

\* cited by examiner

SYSTEM AND METHOD FOR SIMULATION OF CYBERATTACKS WITH EXECUTION CONFIRMATION

CROSS REFERENCE TO RELATED APPLICATIONS

This application is a National Stage of International Application No. PCT/US2022/048405 filed Oct. 31, 2022.

BACKGROUND

1. Field

Apparatuses and methods consistent with example embodiments relate to testing protocols for cybersecurity, and more particularly, to confirmation of test execution in parallel with the testing of a computer security system.

2. Description of Related Art

Cybersecurity is an ongoing challenge. Malicious actors are regularly innovating with new attacks, both in general form and by use of specific software. Defending against cyberattacks involves not only adequate defensive systems, but the testing of those systems through simulated attacks to confirm they are operating as intended.

Collectively-prepared defensive measures and other assistance are becoming more freely available. For example, the MITRE ATT&CK® knowledge base defines a wide variety of known techniques used by malicious actors to attack a software system. Building on that knowledge base, the open source Atomic Red Team™ library provides tests to simulate attacks using at least some of these techniques against a target system defended by a security system, to see if the security system will respond as intended.

While such tests are a good starting point, assembling them into a coherent and useful testing strategy, configured properly for the systems to be tested, and keeping the strategy up to date against the latest threats, is its own challenge.

SUMMARY

It is an object of the disclosed system and method to assemble, organize, and manage a set of security tests, each executable to simulate a cyberattack, so as to execute each in an efficient and automated fashion.

It is another object of the disclosed system and method to confirm proper execution of a simulated cyberattack during security testing, to thereby distinguish a failure of testing from a failure of security.

It is yet another object of the disclosed system and method to confirm this execution in an efficient manner, reducing delay in the overall testing procedure.

In accordance with certain embodiments of the present disclosure, a method is provided for simulating cyberattacks with parallel confirmation of execution. The method includes obtaining a plurality of security tests each executable to simulate a cyberattack. The method further includes, on a testing processor, executing each of the plurality of security tests against a target device as a series. The method further includes actuating a search processor to search an activity log of the target device for an indicator of each of the plurality of security tests, and to thereby generate a search result corresponding to each of the plurality of security tests. Each search is actuated following execution of the corresponding security test, and at least one search on the search processor is executed in parallel with execution of one of the plurality of security tests on the testing processor. The method further includes outputting a plurality of test results respectively corresponding to each of the plurality of security tests. At least one of the plurality of test results is based on a search result corresponding to the respective security test, and a response of a security device monitoring the target device during execution of the respective security test.

In accordance with certain embodiments of the present disclosure, a non-transitory computer-readable recording medium is provided, and has recorded thereon instructions executable by at least one processor to perform a method for simulating cyberattacks with parallel confirmation of execution. The method includes obtaining a plurality of security tests each executable to simulate a cyberattack. The method further includes, on a testing processor, executing each of the plurality of security tests against a target device as a series. The method further includes actuating a search processor to search an activity log of the target device for an indicator of each of the plurality of security tests, and to thereby generate a search result corresponding to each of the plurality of security tests. Each search is actuated following execution of the corresponding security test, and at least one search on the search processor is executed in parallel with execution of one of the plurality of security tests on the testing processor. The method further includes outputting a plurality of test results respectively corresponding to each of the plurality of security tests. At least one of the plurality of test results is based on a search result corresponding to the respective security test, and a response of a security device monitoring the target device during execution of the respective security test.

In accordance with certain embodiments of the present disclosure, an electronic device is provided for simulating cyberattacks with parallel confirmation of execution. The electronic device includes at least one non-volatile memory configured to store computer program code, and at least one processor configured to operate as instructed by the computer program code. The computer program code includes test retrieval code configured to cause at least one of the at least one processor to obtain a plurality of security tests each executable to simulate a cyberattack. The computer program code further includes test execution code configured to cause at least one of the at least one processor to execute each of the plurality of security tests against a target device as a series. The computer program code further includes search actuation execution code configured to cause at least one of the at least one processor to actuate a search processor to search an activity log of the target device for an indicator of each of the plurality of security tests, and to thereby generate a search result corresponding to each of the plurality of security tests. Each search is actuated following execution of the corresponding security test, and at least one search on the search processor is executed in parallel with execution of one of the plurality of security tests on the testing processor. The computer program code further includes result output code configured to cause at least one of the at least one processor to output a plurality of test results respectively corresponding to each of the plurality of security tests. At least one of the plurality of test results is based on a search result corresponding to the respective security test, and a response of a security device monitoring the target device during execution of the respective security test.

Additional aspects will be set forth in part in the description that follows and, in part, will be apparent from the description, or may be realized by practice of the presented embodiments of the disclosure.

BRIEF DESCRIPTION OF THE DRAWINGS

Features, aspects and advantages of certain exemplary embodiments of the disclosure will be described below with reference to the accompanying drawings, in which like reference numerals denote like elements, and wherein.

DETAILED DESCRIPTION

The following detailed description of example embodiments refers to the accompanying drawings. The same reference numbers in different drawings may identify the same or similar elements. The embodiments are described below in order to explain the disclosed system and method with reference to the figures illustratively shown in the drawings for certain exemplary embodiments for sample applications.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code-it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

As discussed briefly in the Background, development of a computer security system includes testing its capabilities in detecting cyberattacks, through simulated cyberattacks and other means. Developing a testing strategy is therefore part of development of the security system itself.

In this context, a "security test" is a software program or digital file which, when executed in an appropriate framework, simulates a cyberattack against a designated machine. The security test may be a standalone executable program, or a file which must be opened by or within another software to execute the simulation.

Rather than develop and keep updated a complete set of tests for a testing strategy, a security development team can make use of an existing library of tests, selecting those relevant to the computer system or systems being defended to assemble or define a suitable set of tests for execution. While no such library is complete, a quality library will typically cover the most common forms of attack, the attacks known to cause the greatest harm, and recently discovered attacks that are rising threats.

The Atomic Red Team™ test library is an example of such a test library, and will be referenced in example implementations described herein. However, it is noted that the same principles can be applied to any library of tests, including both publically and privately developed libraries. Additionally, combining libraries, or combining a library with additional tests developed locally to cover the gaps in an existing library, are both within the scope of the disclosed system and method.

Execution of the tests may be desired, in various implementations:
1. When the security system being tested is updated.
2. When one of the existing tests is altered, for at least the altered test.
3. When a new test is added, for at least the added test.
4. When existing logic or rules for detection or response are modified, for at least the modified rules.
5. When a new logic or rule for detection or response is added, for at least the added rule.
6. On a regular schedule (e.g. monthly or quarterly).

The security system will have an intended response to each cyberattack, which may vary based on elements of the attack. In testing, the attack is not truly harmful, but simulated, and so the security system may be configured in a testing environment to respond only with a detection alert, keeping the testing process and its results simple. That is, the test may be focused on determining whether the security system will recognize the attack while it is occurring, which is a necessary first step to any additional response. For simplicity of description, this configuration will be assumed herein, although it is noted that other configurations may also test whether an additional response adequately prevents, reduces, or repairs the (simulated) harm resulting from the attack.

Therefore, in testing, the intended response to an attack may be an alert from the security system that the attack is occurring. If an alert appears, the security system passes the test as it correctly recognized the attack, and in a live environment could have executed other measures if needed.

Particularly when the source of a test is a library developed by another party, it may be desirable to confirm each test is in fact executing correctly. If the test is improperly designed or configured, either generally or with regard to the system being "attacked," the test will not execute properly against its target. If this happens, any "fail" result will be meaningless and must be discounted: the security system cannot be expected to recognize an attack that never occurred.

Therefore, three possible outcomes to a test are:
1. Pass: The test executed correctly, and the security system responded as intended.
2. Fail: The test executed correctly, but the security system failed to respond as intended.
3. Fault: The test did not execute correctly.

To determine whether the test executed correctly, system activity logs may be searched for evidence of the attack. When a selected portion of the logs can be searched after the fact for specific, expected indicators of a deliberate test executed in a timeframe corresponding to the test, a log search is a simple and effective method of confirming the test's execution. A suitable data analysis/management tool or service may be used for this search; one example is Splunk's SIEM solution, which is particularly tailored to security information and event management, but the disclosed system and method is by no means limited thereto.

However, the slow pace of such searches can be highly inconvenient. Even under narrowed search conditions, a search can be lengthy compared to the test itself. Many tests are over in a few seconds, and when the intended response is only an alert, this alert will be simultaneous with the test under a Pass condition. Therefore, when the Fault outcome is not being considered, a Pass or Fail outcome can be determined in seconds.

In contrast, due to the size of a typical system activity log, a search for indicators of the simulated attack is typically on the order of minutes. Furthermore, it may be desired to repeat a search, at least once, when it results in an apparent Fault outcome, to confirm the Fault—that is, to confirm that the search did not somehow fail to find an indicator that nonetheless existed in the logs—before resulting to troubleshooting and reconfiguring or outright discarding a test.

As such, when a lengthy series of tests are planned, including checks for Fault outcomes, through a log search, can transform an hour's worth of testing into a day's worth. A more efficient solution is desired.

Figure 1:
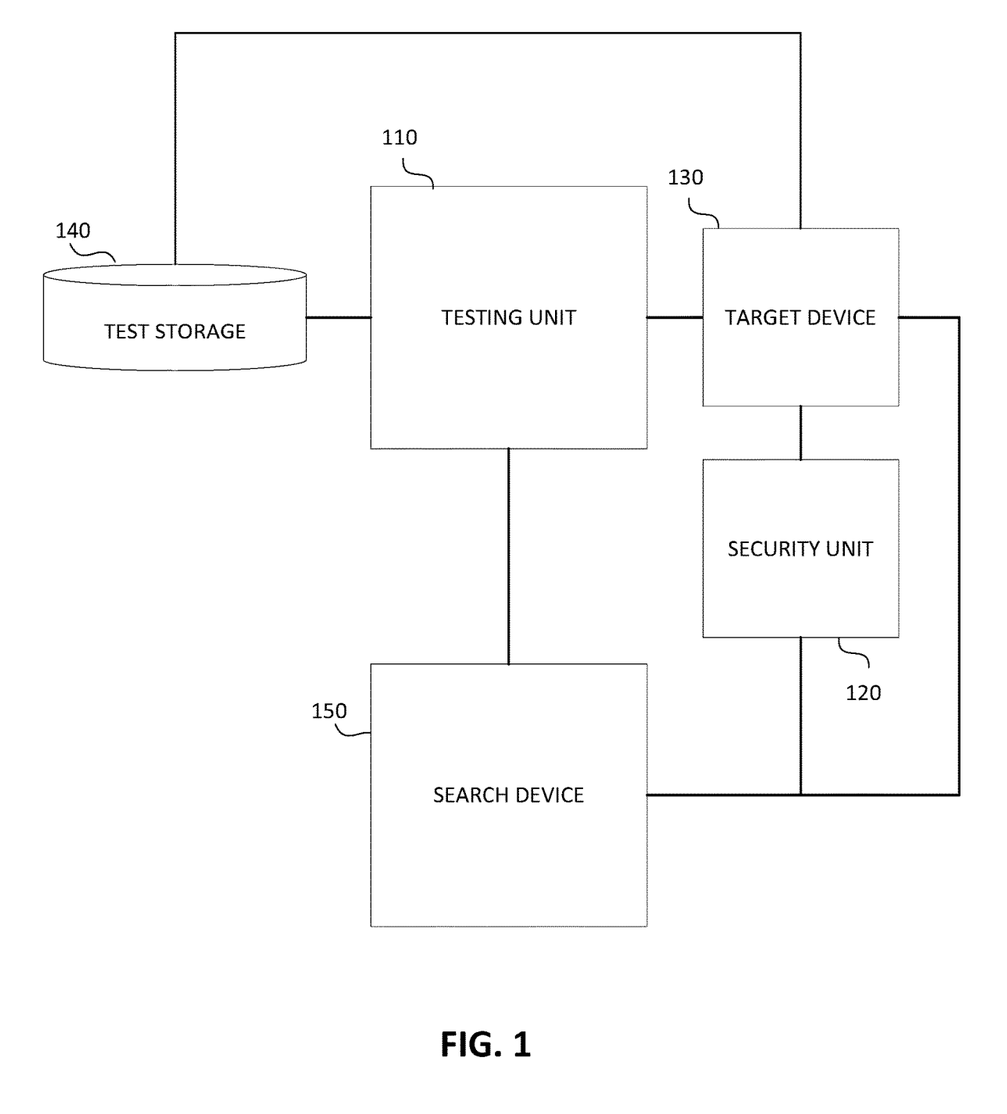
FIG. 1 is a block diagram illustrating a test environment for testing cybersecurity defenses, in accordance with an exemplary embodiment.

FIG. 1 is a block diagram illustrating a test environment for testing cybersecurity defenses, in accordance with an exemplary embodiment.

The system includes a testing unit or testing framework 110, a security unit 120, and at least one target device 130, each of which may be a computing device with one or more processors. The testing unit 110 and the security unit 120 are each coupled to the target device 130 through a network or other communicative coupling.

The testing unit 110 (for example, a testing processor on which the testing unit 110 executes) is configured to execute a series of tests which simulate attacks on the target device 130. The security unit 120 (for example, a security processor on which the security unit 120 executes) is configured to monitor the target device 130 and respond to the simulated attacks of the testing unit 110, when detected, by triggering an alert, internal log entry, and/or suitable preventative measures, among other possibilities. The security unit 120 may monitor the target device 130 according to a configuration intended for use in a live environment, but may also operate in a testing configuration such that preventative measures do not engage; in the testing configuration, the only response of the security unit 120 may be the alert that the attack was noticed.

The target device (or devices) 130 stores activity logs describing, for example, received instructions and corresponding parameters. These logs may be reviewed and searched, internally or externally. In certain embodiments, the target device 130 is a virtual machine, and may simulate the behavior of a physical device.

A library of executable tests may be stored in a test storage 140 coupled to the testing unit 110 and/or the target device 130. Test storage 140 may be a remote or local storage. If a remote storage, test storage 140 may more specifically be a public remote storage; for example, an open source archive such as GitHub®. Test storage 140 may also be a local copy of contents of a remote storage. For example, when making use of the Atomic Red Team™ library, which is remotely stored and made accessible over the Internet, a local copy of all relevant tests may have been made in advance for faster access. If a local storage, test storage 140 may be a memory physically installed within or directly coupled to the testing unit 110 or the target device 130, although this is not a requirement. The testing unit 110 may retrieve tests from the test storage 140 prior to executing them.

A search device 150 may be communicatively coupled to the testing unit 110, and may also be coupled to other devices in the environment such as the security unit 120 and target device 130. The search device 150 (for example, a search processor of the search device 150) may be configured to retrieve the activity logs from the target device 130, search through selected portions of the logs for particular data, and provide those results to the testing unit 110. The search device 150 may be additionally configured to receive detection alerts from the security unit 120 and provide same to the testing unit 110.

In certain implementations, any or all of the testing unit 110, the security unit 120, the target device 130, and/or the search device 150 may be the same physical device, or implemented within the same physical cluster of devices. In such cases, the testing unit 110, security unit 120, target device 130, and search device 150 may be implemented as different software modules on the shared device or cluster. Particular combinations may include, but are not limited to, the security unit 120 and search device 150 implemented in the same device or cluster, and the security unit 120 and target device 130 implemented in the same device or cluster.

Figure 2A:
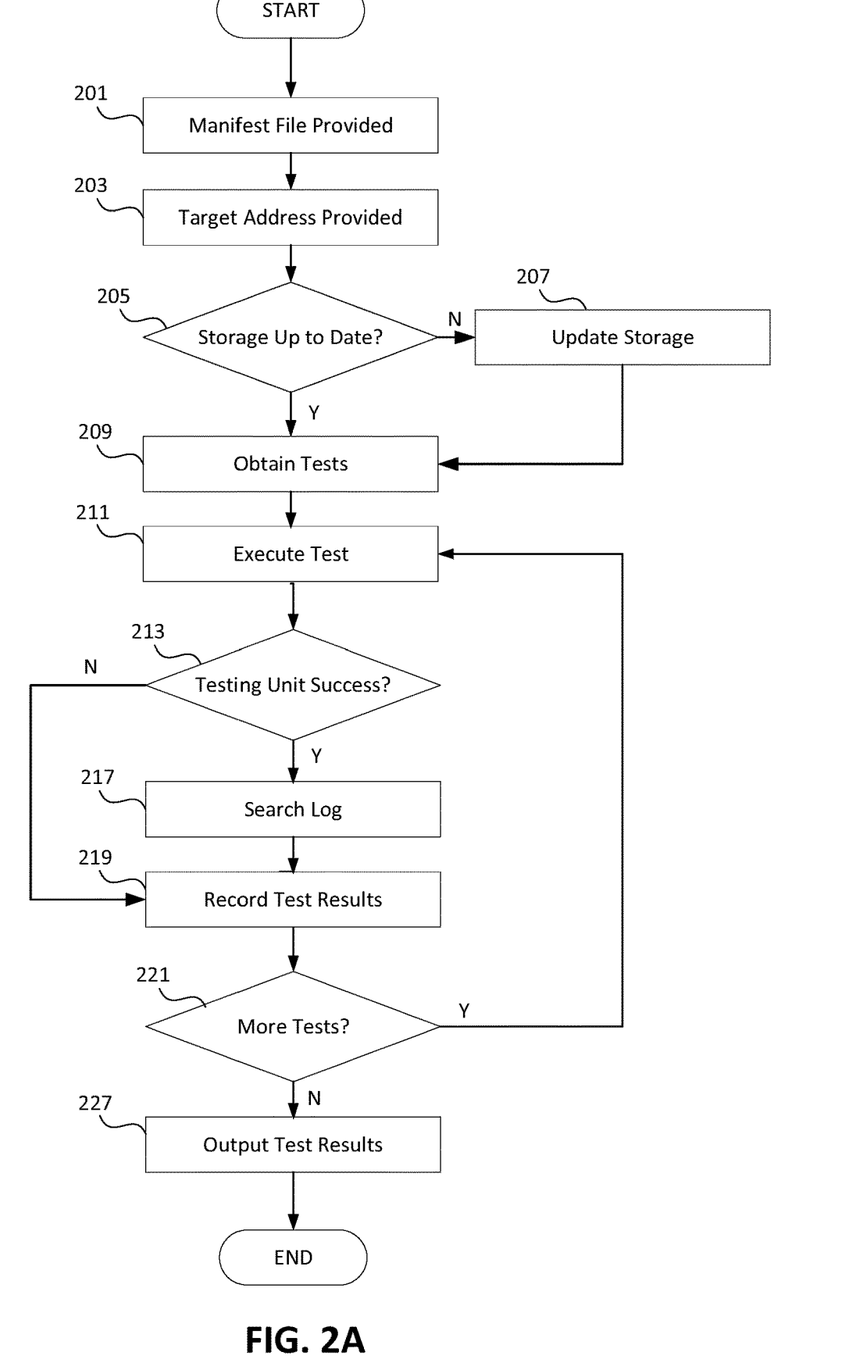
FIG. 2A is a flow diagram illustrating a flow of processes for testing cybersecurity defenses in sequence, in accordance with an exemplary embodiment.

FIG. 2A is a flow diagram illustrating a flow of processes for testing computer security defenses in sequence, in accordance with an exemplary embodiment. The operations herein are executed on at least one processor, for example the processor of testing unit 110.

At 201, a test definition file, which may also be termed a testing manifest file, is provided. The manifest file defines a set of security tests which will be executed in sequence. The manifest file may be in any format suitable for expressing delimited data records having associated parameter values, including but not limited to XML files, comma separated value files, and "spreadsheet" files.

Each security test may be defined according to an identifier, which refers to an executable security test stored in a local or remote database. The identifier may also refer to more than one such test; such an identifier will be termed a "test set identifier" herein for convenience. For example, a set of tests collectively referenced by a test set identifier may all target the same detection rule, or may all use the same attack technique, but may also have differences that require a distinct executable. In a more specific example, a test set identifier may be for "an attack that clears system event logs," but more than one such test exists, each using a different specific set of system commands to clear the event logs. In such case, it would be preferable to confirm that the security system will detect the attack regardless of the specific commands used, and so all such tests will be obtained and executed, as will be described further herein. In another more specific example, a test set identifier may be for "an attack that clears system event logs," but more than one such test exists, each designed to attack a different operating system, or other category of machine or platform. In such case, the tests specific to the operating system of the machine being targeted by the simulation may be obtained and executed, as will be described further herein.

Multiple identifiers may be provided in the testing manifest file for the same security test or test set, each under a differing system of identification. For example, when making use of the Atomic Red Team™ library of tests, which itself is based on the MITRE ATT&CK® knowledge base, identifiers according to both the library and the knowledge base may be included.

The testing manifest file may also define other parameters, either generally to the manifest or for each test, which will be described further herein as they become relevant.

At 203, an address or other identifier for a machine (or machines) which will be "targeted" by the simulated tests (e.g. target device 130), and which is monitored by security unit 120, is provided. Characteristics of target device 130, such as its operating system, may also be provided, or retrieved directly from target device 130.

At 209, the tests identified in the manifest are obtained from a database or other data storage (e.g. test storage 140).

If test storage 140 is a partial or complete copy of a remote storage, it may first be confirmed at 205 whether all tests are present and up to date in the test storage 140. This may be an automatic check, by comparing version numbers of the locally stored copies with those of the remotely-stored copies. The check may also be manually actuated. If, according to the check, all tests are locally stored and up to date ("Yes" at 205), the workflow continues to 209 and obtains the appropriate tests; this also occurs if the check requires a manual actuation which is not provided. Otherwise ("No" at 205), up-to-date versions are retrieved from the remote storage at 207 and copied to test storage 140, before proceeding to 209.

As previously noted, there may be more than specific test for each test identifier. Operation 209 obtains all, some, or none of these tests according to which are applicable. Applicability may be determined based on a selection parameter value, such as a characteristic of the target device 130, which may be included in the manifest file or determined by other means. For example, either the manifest file received at 201 or the machine characteristics determined at 203 may identify the operating system of the target device 130, and tests specific to a different operating system may be omitted from loading according to this information. In certain embodiments, tests simulating an attack which specifically exploits software or hardware may be selectively included or omitted based on a determination of test prerequisites for the target device 130 (including but not limited to the presence of the software or hardware on the device).

With the manifest file processed and the appropriate tests obtained, one of the tests is executed at 211, for example by the testing unit 110. The manifest file typically defines a specific order for testing and therefore a first test to run, although it is also possible in certain embodiments to select any test which has not already been run. A simulated attack is executed against the target device 130, with the security unit 120 monitoring the target device 130 during the simulated attack. The security unit 120 responds during the test execution by triggering an alert or other response if the attack is detected, and not triggering an alert or other response if the attack is not detected. Also, the activity on the target device 130 is generally recorded by the target device 130 in an activity log thereof.

At 213, the testing unit 110 or other source of the simulated attack performs an initial confirmation that the attack executed as intended, as dispatched by the testing unit 110. If, based on the information that the testing unit 110 has immediate access to, the test did not execute as intended ("No" at 213), the result of the test is "Fault" and the workflow proceeds directly to 219; operation 217 will be unnecessary. If, based on the information that the testing unit 110 has immediate access to, the test executed as intended ("Yes" at 213), the workflow continues to 217.

At 217, the log of the target device 130 is searched to perform an additional confirmation that the test executed as intended, as received by the target device 130. The manifest file may associate a specific search term and/or other search parameters with each test, which will find an indicator of the simulated attack in the log. Typically, although not necessarily, all tests in a test set (that is, having the same test identifier) will produce the same indicator in the log, and will therefore have the same search term and parameters.

It is noted that a plurality or set of indicators may collectively indicate the simulated attack in the log. However, for brevity, a single indicator will be assumed going forward.

The search may be operated by an outside service or other software not implemented on the testing unit 110. In such circumstances, the testing unit 110 actuates the search through instructions sent to the appropriate search device 150, such as an outside server, which performs the search according to the instructions on at least one processor thereof. The testing unit 110 may also operate the search directly.

If the search does not locate the indicator, the result of the test is "Fault". If the search locates the indicator, the result of the test is in accordance with the response of the security unit 120 to the test (e.g., whether a timely alert was generated).

Once received, the result of the test is recorded at 219 as a test result in association with the test. In certain embodiments, "Fault"/"No Fault" may be recorded as its own (first result) parameter, separate from a "Pass"/"Fail" parameter (a second result parameter) indicating whether the security unit 120 responded correctly; if the first result parameter value is "Fault," the second result parameter value may be ignored as irrelevant, while if the first result parameter value is "No Fault," the second result parameter value may be treated as relevant. Other data, such as timestamps of various points in the test (e.g. start and end time for the test, start and end time for the search, and/or time of any alert), may also be recorded in the test result.

At 221, if there is at least one test which was obtained at 209 but has not yet been executed ("Yes" at 221), the workflow returns to 211 and the next test is executed. Otherwise ("No" at 221), the recorded test results are outputted at 227, and the testing process ends.

As noted previously, operation 217 can insert a potentially heavy time expense into completion of this method, with each iteration requiring several minutes. Reduction of this delay is desirable.

Figure 2B:
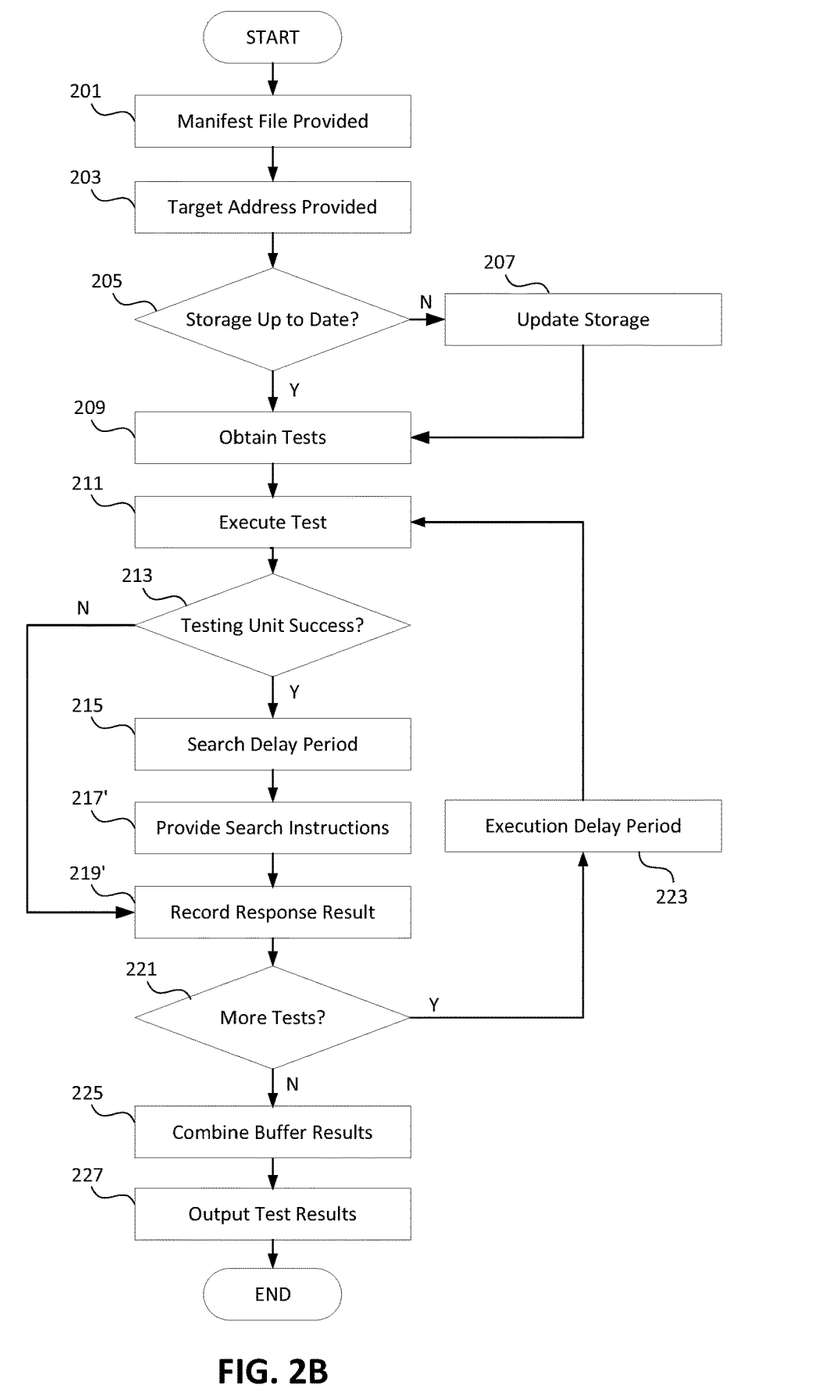
FIG. 2B is a flow diagram illustrating a flow of processes for testing cybersecurity defenses in a sequence-parallel hybrid approach, in accordance with an exemplary embodiment.

FIG. 2B is a flow diagram illustrating a flow of processes for testing computer security defenses in a sequence-parallel hybrid approach, in accordance with an exemplary embodiment.

According to the embodiment of FIG. 2B, operations 201-213 occur as described with respect to FIG. 2A.

Operation 217' occurs largely as operation 217 is described with respect to FIG. 2A, but the search is not operated by the testing unit 110 in this embodiment; the testing unit 110 actuates another processor on a search device 150, through transmitted instructions. Additionally, in certain embodiments, the testing unit 110 waits at 215 for a search delay period to elapse before transmitting the actuating instructions, such that the search device 150 will not begin the search until the search delay period elapses. This search delay period may be predetermined to apply generally to all tests, or may be specific to each test or test identifier and defined, in association with the corresponding test identifier, in the manifest file. The testing unit 110 may continue to execute other operations, notwithstanding that it is simultaneously holding the search instructions for transmission at the end of the search delay period; for example, the testing unit 110 may concurrently proceed to operation 219'. The purpose of this search delay period will be explained shortly herein.

Instead of waiting for the search result, as implicitly required for operation 219 in the embodiment of FIG. 2A, only the response result (e.g., an alert from the security unit 120) is stored as a "Pass"/"Fail" in operation 219', and the "Fault"/"No Fault" result is, for the moment, omitted. Then flow proceeds to 221, which occurs as described with respect to FIG. 2A. If the search device 150 also monitors for the alerts, operation 219' is omitted entirely and the flow proceeds directly to 221.

However, before returning to 211 for the next test, the testing unit 110 waits at 223 until the duration of an execution delay period elapses. This execution delay period may be predetermined and applied generally to all tests, or may be specific to each test or test identifier and defined, in association with the corresponding test identifier, in the manifest file. In the latter case, it is noted that the execution delay period associated with the test previously executed, and not the test which will be next executed, which is applied at 223. The purpose of this execution delay period will be explained shortly. Once the execution delay period elapses, the next iteration of operation 211 and following operations begins.

According to the embodiment of FIG. 2B, search results received from the search device 150 are stored in a buffer until all searches are completed. If the search device 150 also monitors the security unit 120 for alerts, these alerts, or a notation of a lack thereof, are also stored in this buffer. Then, at 225, all results in the buffer are recorded as part of test results of their corresponding tests, as they would have been for operation 219 in FIG. 2A. (It is noted that, if a result in the buffer is "Fault", a corresponding "Pass"/"Fail" response result recorded at 219' may be made retroactively irrelevant, as the security unit 120 cannot be expected to respond correctly to an improperly executed test.) The output at 227 then occurs as described with respect to FIG. 2A, and the method ends.

Figure 2C:
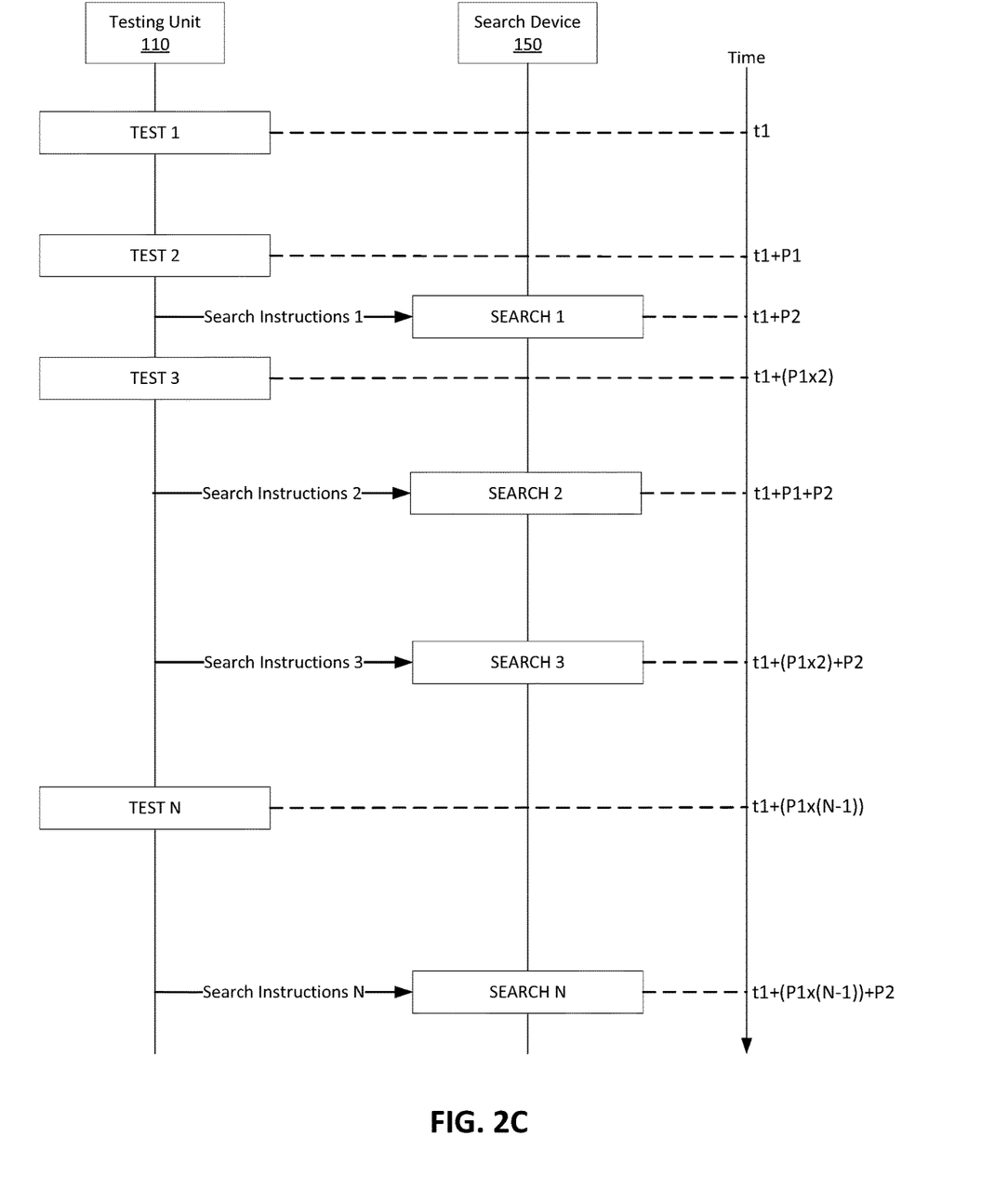
FIGS. 2C and 2D are sequence diagrams illustrating the timing of certain operations described with respect to FIG. 2B, in accordance with exemplary embodiments.

FIG. 2C is a sequence diagram illustrating an example timing of certain operations described with respect to FIG. 2B, in accordance with an exemplary embodiment.

In this example sequence diagram, for simplicity of explanation, the duration of an execution delay period P1 is the same for all tests, and likewise the duration of a search delay period P2 is the same for all tests. It is again noted that this is not a requirement, and instead each test or test set may have its own delay durations associated therewith, which may be defined in the manifest file or elsewhere. Those of skill in the art will be able to extrapolate the disclosures herein to such embodiments.

At time t1, a first iteration of operation 211 occurs and a first test is executed by the testing unit 110, then confirmed at 213 (not depicted in FIG. 2C). Following a wait for a search delay period P2 at operation 215, a first iteration of operation 217' occurs and search instructions for indicators of the first test are provided to the search device 150.

Following operations 219' and 221 (not depicted in FIG. 2C), the testing unit 110 arrives at a first iteration of operation 223, to wait for an execution delay period P1. The time may be expected to be still very close to t1 at this point, particularly in embodiments where the testing unit 110 does not wait for the search delay period P2 to complete before proceeding to operations 219' and 221. As such, each of the delay periods may be computed from any of the start of execution of the test (at operation 211), the end of execution of the test, or the end of operation 221, while still achieving the overall purpose of the delay periods. For convenience, the remaining description will assume that both delay periods P1 and P2 are computed from the start of execution of the test at operation 211. Therefore, at time t1+P1, the testing unit 110 will perform a second iteration of operation 211.

Meanwhile, at time t1+P2, the search device 150 will commence a search of the logs for the indicators of the first iteration of operation 211; more specifically, it will search log entries of the log recorded within the period t1 to t1+P1. The portion of the log recorded within this period may be determined according to, for example, timestamps of the log entries.

Because each search does not immediately follow its corresponding test, but can indeed operate in parallel with multiple tests, portions of the log that respectively correspond to each iteration of testing are preferably delineated. If this delineation is not clear, an indicator of a first test could be mistaken for an indicator of a second test, or vice versa. The execution delay period P1 therefore serves a purpose of delineation of the logs, with each iteration corresponding to a period P1 in length within the logs.

Search device 150 preferably waits until at least some log entries related to a test iteration are not only recorded but provided to the search device 150 and placed in a condition ready for search. The search delay period P2 therefore serves a purpose of ensuring that necessary operations in preparation for the search are complete, for at least some log entries associated with the test corresponding to the search.

Suitable values for both P1 and P2 will vary depending on a number of aspects of the systems involved and their configurations, and may be determined through experimentation. A value for P1 should be sufficient to ensure that any indicators of a test iteration have been logged, and no further indicators will appear at a later point in the log, but not so long as to cause unnecessary delay in testing. A value for P2 should be sufficient to ensure at least some relevant activity logs are recorded at the target device 130 and then provided to the search device 150, but not so long as to cause unnecessary delay in testing. It is also noted that, in at least some embodiments, the search device 150 can perform a plurality of searches simultaneously and asynchronously; in such embodiments, P2 may be shorter than the expected amount of time to complete a prior search.

In accordance with the above principles, FIG. 2C illustrates a series of tests executed by the testing unit 110 in parallel with a series of searches executed by the search device 150. The tests are spaced apart in time from each other by durations P1 in length, and the searches are spaced apart in time from commencement of the corresponding test by durations P2 in length. Each search may be executed in parallel with any of the security tests, without one interfering with the other; for example, in the depicted timing of FIG. 2C, Search 1 is likely to be operating in parallel with Test 3.

It can be seen that, for any N number of test executions, completion of all tests will only require (N−1)×P1, after which all resources save for the search device 150 can be freed for other uses. Additionally, completion of all searches will only require ((N−1)×P1)+P2, plus a time to complete the final (Nth) search.

Figure 2D:
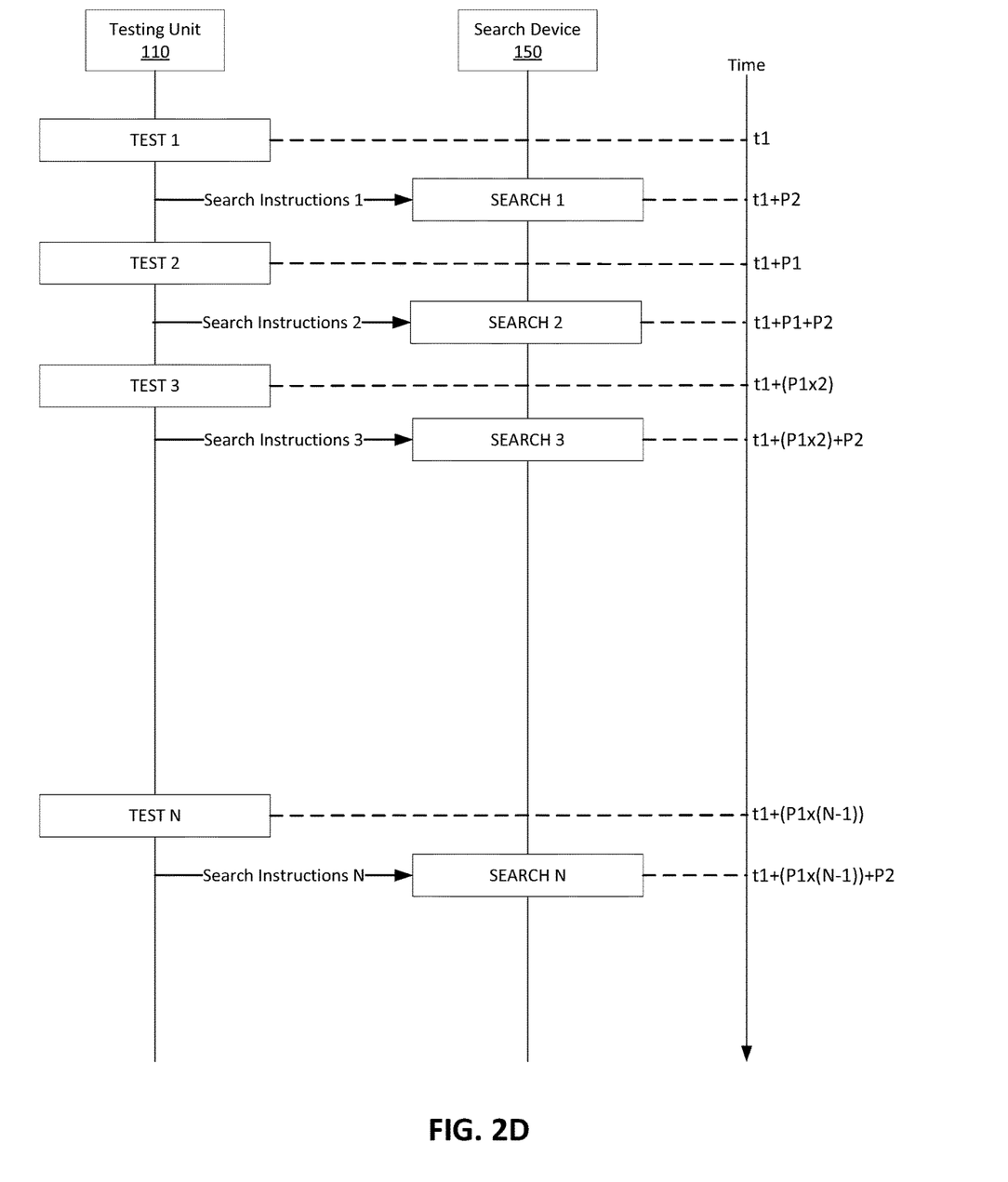

While FIG. 2C depicts P2 as longer than P1, implementations with P2 being shorter than or equal to P1 are also within the scope of the invention. For example, FIG. 2D is a sequence diagram illustrating an example timing in accordance with an alternative embodiment to that of FIG. 2C, where P2 is shorter than P1. It is noted that a search N may not be able to complete until a test N+1 commences, as search N may search the logs between t1+(P1×(N−1)) (the time that test N commences) and t1+(P1×N) (the time that test N+1 commences) in at least some embodiments, However, if search N begins at t1+(P1×(N−1))+P2, as depicted, the search will have already have at least a portion of the log to be searched available, namely, a portion representing at least approximately a duration P2. As a search of a log representing a duration P1 is expected to require considerably more time than the duration of P1 itself, t1+(P1×N) may be expected to pass before the search attempts to review a log entry representing time t1+(P1×N).

For simplicity of description, the disclosure has described the testing unit 110 as waiting for the search delay period P2 to elapse after each test, at operation 215, before transmitting the corresponding search instructions to the search device 150 at operation 217'. However, it is within the scope of the disclosed system and method that the testing unit 110 omits operation 215 and transmits the instructions at operation 217' promptly, but indicates the search delay period P2 in the instructions, such that the search device 150 is instructed to wait for the search delay period P2 to elapse before performing the search. This approach may enable certain testing units, which have limited capability to manage multiple concurrent tasks, to still proceed to operation 219' without first waiting for the duration P2 to elapse.

These and related processes, and other necessary instructions, may be encoded as executable instructions on one or more non-transitory computer-readable media, such as hard disc drives or optical discs, and executed using one or more computer processors, in concert with an operating system or other suitable measures. Likewise, one or more of the above components described above may be implemented as instructions stored on a computer-readable storage medium and executable by at least one processor (and/or may include at least one processor).

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

In a software implementation, the software may include a plurality of computer executable instructions, to be implemented on a computer system. Prior to loading in a computer system, the software may reside as encoded information on a suitable tangible, non-transitory, computer-readable storage medium, such as magnetically, optically, or other suitably encoded or recorded media. The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing, In certain embodiments, the computer-readable storage medium may take the form of pre-existing data storage (such as "cloud storage") accessible through an operably coupled network means (such as the Internet). A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar. The computer-readable program instructions may execute entirely on a user's computer, partly on the user's computer, as a stand-alone software package, partly on the user's computer and partly on a remote computer or server, or entirely on the remote computer or server. In scenarios involving a remote computer or server, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects or operations.

In certain implementations, a system includes a dedicated processor or processing portions of a system on chip (SOC), portions of a field programmable gate array (FPGA), or other such suitable measures, executing processor instructions for performing the functions described herein or emulating certain structures defined herein. Suitable circuits using, for example, discrete logic gates such as in an Application Specific Integrated Circuit (ASIC), Programmable Logic Array (PLA), or Field Programmable Gate Arrays (FPGA) are in certain embodiments also developed to perform these functions.

Figure 3:
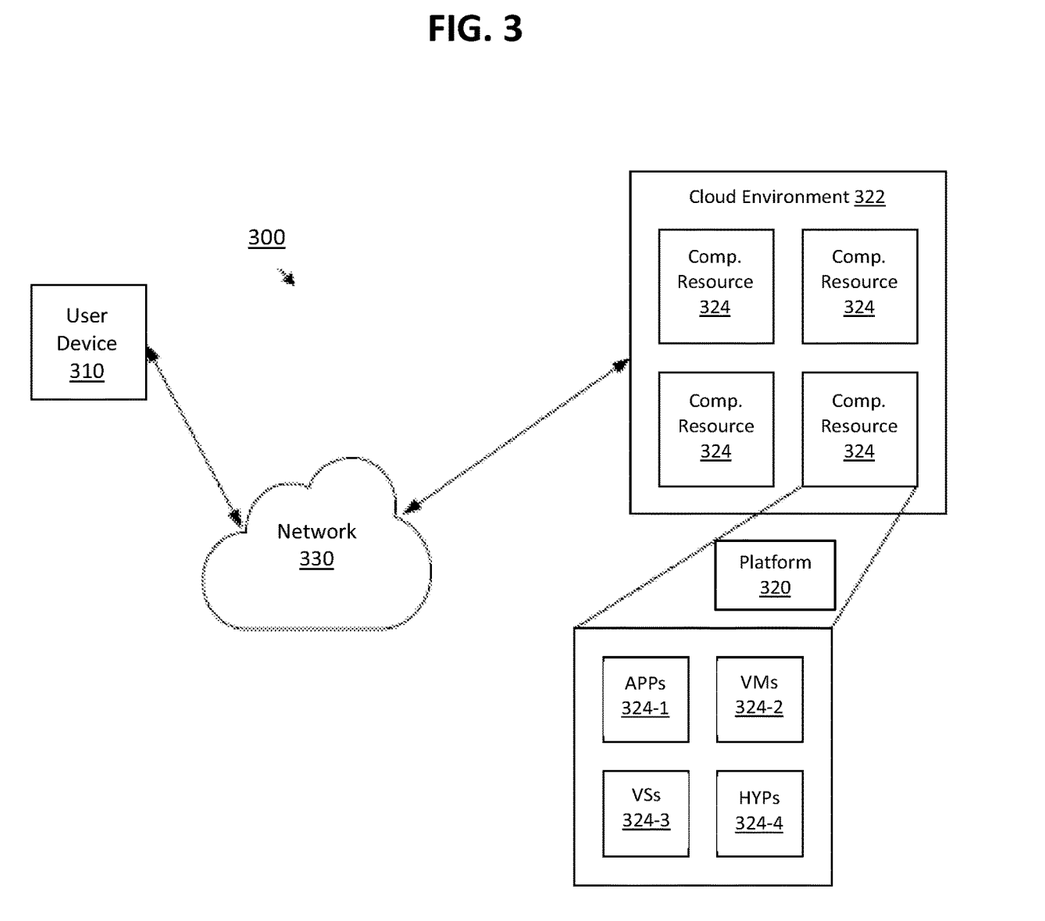
FIG. 3 is a diagram of an example environment in which embodiments of the systems and/or methods described herein may be implemented.

FIG. 3 is a diagram of an example environment 300 in which systems and/or methods, described herein, may be implemented. As shown in FIG. 3, environment 300 may include a user device 310, a platform 320, and a network 330. Devices of environment 300 may interconnect via wired connections, wireless connections, or a combination of wired and wireless connections. In embodiments, any of the functions and operations described with reference to FIG. 2A-2D above may be performed by any combination of elements illustrated in FIG. 3.

User device 310 includes one or more devices capable of receiving, generating, storing, processing, and/or providing information associated with platform 320. For example, user device 310 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, user device 310 may receive information from and/or transmit information to platform 320.

Platform 320 includes one or more devices capable of receiving, generating, storing, processing, and/or providing information. In some implementations, platform 320 may include a cloud server or a group of cloud servers. In some implementations, platform 320 may be designed to be modular such that certain software components may be swapped in or out depending on a particular need. As such, platform 320 may be easily and/or quickly reconfigured for different uses.

In some implementations, as shown, platform 320 may be hosted in cloud computing environment 322. Notably, while implementations described herein describe platform 320 as being hosted in cloud computing environment 322, in some implementations, platform 320 may not be cloud-based (i.e., may be implemented outside of a cloud computing environment) or may be partially cloud-based.

Cloud computing environment 322 includes an environment that hosts platform 320. Cloud computing environment 322 may provide computation, software, data access, storage, etc., services that do not require end-user (e.g., user device 310) knowledge of a physical location and configuration of system(s) and/or device(s) that hosts platform 320. As shown, cloud computing environment 322 may include a group of computing resources 324 (referred to collectively as "computing resources 324" and individually as "computing resource 324").

Computing resource 324 includes one or more personal computers, a cluster of computing devices, workstation computers, server devices, or other types of computation and/or communication devices. In some implementations, computing resource 324 may host platform 320. The cloud resources may include compute instances executing in computing resource 324, storage devices provided in computing resource 324, data transfer devices provided by computing resource 324, etc. In some implementations, computing resource 324 may communicate with other computing resources 324 via wired connections, wireless connections, or a combination of wired and wireless connections.

As further shown in FIG. 3, computing resource 324 includes a group of cloud resources, such as one or more applications ("APPs") 324-1, one or more virtual machines ("VMs") 324-2, virtualized storage ("VSs") 324-3, one or more hypervisors ("HYPs") 324-4, or the like.

Application 324-1 includes one or more software applications that may be provided to or accessed by user device 310. Application 324-1 may eliminate a need to install and execute the software applications on user device 310. For example, application 324-1 may include software associated with platform 320 and/or any other software capable of being provided via cloud computing environment 322. In some implementations, one application 324-1 may send/receive information to/from one or more other applications 324-1, via virtual machine 324-2.

Virtual machine 324-2 includes a software implementation of a machine (e.g., a computer) that executes programs like a physical machine. Virtual machine 324-2 may be either a system virtual machine or a process virtual machine, depending upon use and degree of correspondence to any real machine by virtual machine 324-2. A system virtual machine may provide a complete system platform that supports execution of a complete operating system ("OS"). A process virtual machine may execute a single program, and may support a single process. In some implementations, virtual machine 324-2 may execute on behalf of a user (e.g., user device 310), and may manage infrastructure of cloud computing environment 322, such as data management, synchronization, or long-duration data transfers.

Virtualized storage 324-3 includes one or more storage systems and/or one or more devices that use virtualization techniques within the storage systems or devices of computing resource 324. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 324-4 may provide hardware virtualization techniques that allow multiple operating systems (e.g., "guest operating systems") to execute concurrently on a host computer, such as computing resource 324. Hypervisor 324-4 may present a virtual operating platform to the guest operating systems, and may manage the execution of the guest operating systems. Multiple instances of a variety of operating systems may share virtualized hardware resources.

Network 330 includes one or more wired and/or wireless networks. For example, network 330 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
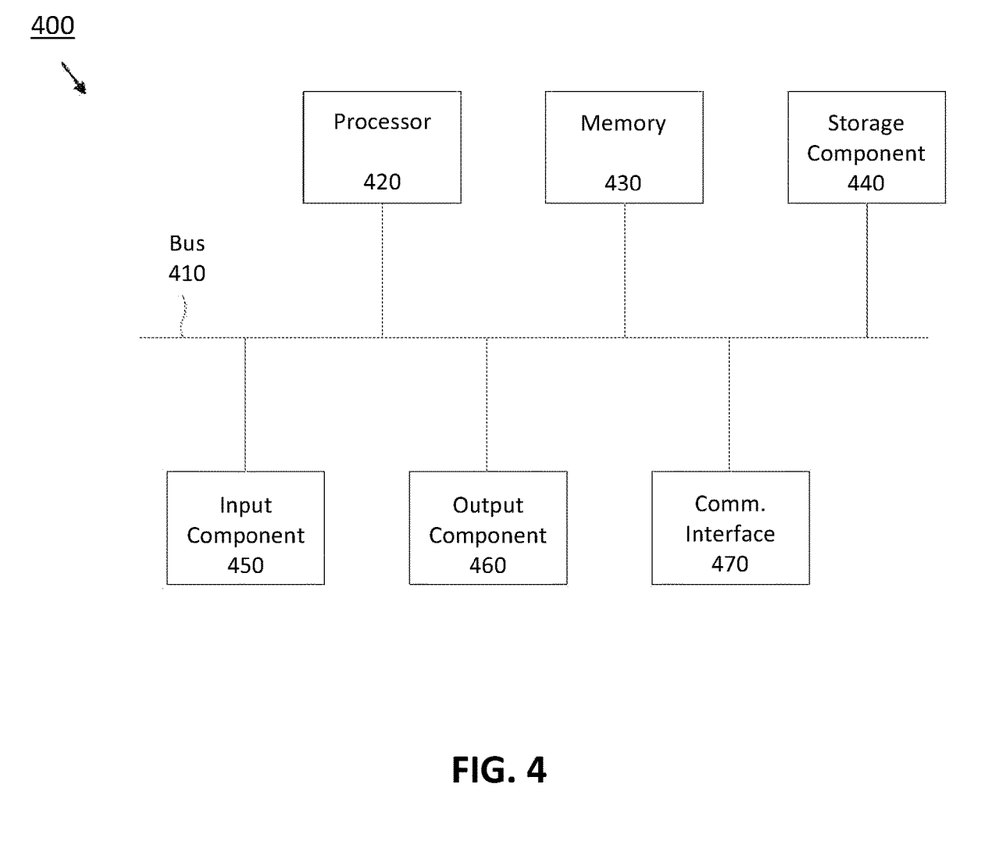
FIG. 4 is a diagram of example components of a device on which embodiments of the systems and/or methods described herein may be implemented.

FIG. 4 is a diagram of example components of a device 400. Device 400 may correspond to user device 310 and/or platform 320. Device 400 may also correspond to any of testing unit 110, security unit 120, target device 130, search device 150, and/or a device which houses test storage 140. As shown in FIG. 4, device 400 may include a bus 410, a processor 420, a memory 430, a storage component 440, an input component 450, an output component 460, and a communication interface 470.

Bus 410 includes a component that permits communication among the components of device 400. Processor 420 may be implemented in hardware, firmware, or a combination of hardware and software. Processor 420 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 includes one or more processors capable of being programmed to perform a function. Memory 430 includes a random access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 450 includes a component that permits device 400 to receive information, such as via user input (e.g., a touch screen display, a keyboard, a keypad, a mouse, a button, a switch, and/or a microphone). Additionally, or alternatively, input component 450 may include a sensor for sensing information (e.g., a global positioning system (GPS) component, an accelerometer, a gyroscope, and/or an actuator). Output component 460 includes a component that provides output information from device 400 (e.g., a display, a speaker, and/or one or more light-emitting diodes (LEDs)).

Communication interface 470 includes a transceiver-like component (e.g., a transceiver and/or a separate receiver and transmitter) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, a radio frequency (RF) interface, a universal serial bus (USB) interface, a Wi-Fi interface, a cellular network interface, or the like.

Device 400 may perform one or more processes described herein. Device 400 may perform these processes in response to processor 420 executing software instructions stored by a non-transitory computer-readable medium, such as memory 430 and/or storage component 440. A computer-readable medium is defined herein as a non-transitory memory device. A memory device includes memory space within a single physical storage device or memory space spread across multiple physical storage devices.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

In embodiments, any one of the operations or processes of FIGS. 2A-2D may be implemented by or using any one of the elements illustrated in FIG. 4.

Using the disclosed system and method, the three outcomes of Pass, Fail, and Fault may all be considered to have a more accurate gauge of the results of security tests. This may be accomplished in an automated fashion, and with relatively efficient use of system resources due to partially parallel execution across at least two processors. The security tests may be obtained and executed in series through use of a manifest file or similar, and may efficiently obtain updated versions of the tests when using an outside source.

The foregoing disclosure provides illustration and description, but is not intended to be exhaustive or to limit the implementations to the precise form disclosed. Modifications and variations are possible in light of the above disclosure or may be acquired from practice of the implementations.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code-it being understood that software and hardware may be designed to implement the systems and/or methods based on the description herein.

What is claimed is:

1. A method for simulating cyberattacks with parallel confirmation of execution, the method comprising:
    obtaining a plurality of security tests each executable to simulate a cyberattack;
    on a testing processor, executing each of the plurality of security tests against a target device as a series;
    actuating a search processor to search an activity log of the target device for an indicator of each of the plurality of security tests and to thereby generate a search result corresponding to each of the plurality of security tests, each search being actuated following execution of the corresponding security test, at least one search on the search processor being executed in parallel with execution of one of the plurality of security tests on the testing processor; and
    outputting a plurality of test results respectively corresponding to each of the plurality of security tests, at least one of the plurality of test results based on:
        a search result corresponding to the respective security test, and
        a response of a security device monitoring the target device during execution of the respective security test,
    wherein the search processor is actuated to search for the indicator of one of the plurality of security tests after a predetermined search delay duration has elapsed following execution of the corresponding security test, and
        wherein, following a first security test in the series, each of the plurality of security tests is executed after a predetermined execution delay duration has elapsed following execution of a previous security test.

2. The method of claim 1, wherein the plurality of security tests are obtained based on a provided plurality of test identifiers, at least one of the plurality of test identifiers being a test set identifier corresponding to more than one security test, the obtaining of the plurality of security tests including obtaining each security test corresponding to the test set identifier.

3. The method of claim 1, wherein the plurality of security tests are obtained based on a provided selection parameter value and a provided plurality of test identifiers, at least one of the plurality of test identifiers being a test set identifier corresponding to more than one security test, the obtaining of the plurality of security tests including obtaining each security test corresponding to the test set identifier and indicated by the selection parameter value.

4. The method of claim 3, wherein the selection parameter value is an operating system of the target device.

5. The method of claim 1, wherein each of the plurality of security tests has an execution delay duration and a search delay duration associated therewith.

6. A non-transitory computer-readable recording medium having recorded thereon instructions executable by at least one processor to perform a method for simulating cyberattacks with parallel confirmation of execution, the method comprising:
    obtaining a plurality of security tests each executable to simulate a cyberattack;
    on a testing processor, executing each of the plurality of security tests against a target device as a series;
    actuating a search processor to search an activity log of the target device for an indicator of each of the plurality of security tests and to thereby generate a search result corresponding to each of the plurality of security tests, each search being actuated following execution of the corresponding security test, at least one search on the search processor being executed in parallel with execution of one of the plurality of security tests on the testing processor; and
    outputting a plurality of test results respectively corresponding to each of the plurality of security tests, at least one of the plurality of test results based on:
        a search result corresponding to the respective security test, and a response of a security device monitoring the target device during execution of the respective security test, wherein the search processor is actuated to search for the indicator of one of the plurality of security tests after a predetermined search delay duration has elapsed following execution of the corresponding security test, and wherein, following a first security test in the series, each of the plurality of security tests is executed after a predetermined execution delay duration has elapsed following execution of a previous security test.

7. The recording medium of claim 6, wherein the plurality of security tests are obtained based on a provided plurality of test identifiers, at least one of the plurality of test identifiers being a test set identifier corresponding to more than one security test, the obtaining of the plurality of security tests including obtaining each security test corresponding to the test set identifier.

8. The recording medium of claim 6, wherein the plurality of security tests are obtained based on a provided selection parameter value and a provided plurality of test identifiers, at least one of the plurality of test identifiers being a test set identifier corresponding to more than one security test, the obtaining of the plurality of security tests including obtaining each security test corresponding to the test set identifier and indicated by the selection parameter value.

9. The recording medium of claim 8, wherein the selection parameter value is an operating system of the target device.

10. An electronic device for simulating cyberattacks with parallel confirmation of execution, the device comprising:
at least one non-volatile memory configured to store computer program code; and
at least one processor configured to operate as instructed by the computer program code, the computer program code comprising:
test retrieval code configured to cause at least one of the at least one processor to obtain a plurality of security tests each executable to simulate a cyberattack;
test execution code configured to cause at least one of the at least one processor to execute each of the plurality of security tests against a target device as a series;
search actuation execution code configured to cause at least one of the at least one processor to actuate a search processor to search an activity log of the target device for an indicator of each of the plurality of security tests and to thereby generate a search result corresponding to each of the plurality of security tests, each search being actuated following execution of the corresponding security test, at least one search on the search processor being executed in parallel with execution of one of the plurality of security tests on the at least one processor; and
result output code configured to cause at least one of the at least one processor to output a plurality of test results respectively corresponding to each of the plurality of security tests, at least one of the plurality of test results based on:
a search result corresponding to the respective security test, and
a response of a security device monitoring the target device during execution of the respective security test, wherein the search processor is actuated to search for the indicator of one of the plurality of security tests after a predetermined search delay duration has elapsed following execution of the corresponding security test, and wherein, following a first security test in the series, each of the plurality of security tests is executed after a predetermined execution delay duration has elapsed following execution of a previous security test.

11. The electronic device of claim 10, wherein the plurality of security tests are obtained based on a provided plurality of test identifiers, at least one of the plurality of test identifiers being a test set identifier corresponding to more than one security test, the obtaining of the plurality of security tests including obtaining each security test corresponding to the test set identifier.

12. The electronic device of claim 10, wherein the plurality of security tests are obtained based on a provided selection parameter value and a provided plurality of test identifiers, at least one of the plurality of test identifiers being a test set identifier corresponding to more than one security test, the obtaining of the plurality of security tests including obtaining each security test corresponding to the test set identifier and indicated by the selection parameter value.

13. The electronic device of claim 12, wherein the selection parameter value is an operating system of the target device.

14. The electronic device of claim 10, wherein each of the plurality of security tests has an execution delay duration and a search delay duration associated therewith.

\* \* \* \* \*